(12) United States Patent
Beier et al.

(10) Patent No.: US 11,284,052 B2
(45) Date of Patent: Mar. 22, 2022

(54) METHOD FOR AUTOMATICALLY RESTORING A CALIBRATED STATE OF A PROJECTION SYSTEM

(71) Applicant: Domeprojection.com GmbH, Berlin (DE)

(72) Inventors: Daniel Beier, Magdeburg (DE); Danilo Gulamhussene, Magdeburg (DE); Christoph Bode, Magdeburg (DE); Christian Steinmann, Magdeburg (DE)

(73) Assignee: Domeprojection.com GmbH, Berlin (DE)

( * ) Notice: Subject to any disclaimer, the term of this patent is extended or adjusted under 35 U.S.C. 154(b) by 123 days.

(21) Appl. No.: 16/763,464

(22) PCT Filed: Nov. 10, 2018

(86) PCT No.: PCT/DE2018/000327
§ 371 (c)(1),
(2) Date: May 12, 2020

(87) PCT Pub. No.: WO2019/096339
PCT Pub. Date: May 23, 2019

(65) Prior Publication Data
US 2022/0006989 A1 Jan. 6, 2022

(30) Foreign Application Priority Data

Nov. 17, 2017 (DE) .......................... 102017010683.5

(51) Int. Cl.
*H04N 9/31* (2006.01)
*G03B 21/14* (2006.01)

(52) U.S. Cl.
CPC ........... *H04N 9/3185* (2013.01); *G03B 21/14* (2013.01); *H04N 9/3147* (2013.01); *H04N 9/3194* (2013.01)

(58) Field of Classification Search
CPC ...... H04N 9/31; H04N 9/3186; H04N 9/3147; H04N 9/3184; G03B 21/14; G03B 21/147
(Continued)

(56) References Cited

U.S. PATENT DOCUMENTS

| 6,456,339 B1 | 9/2002 | Surati et al. |
| 11,115,633 B2 * | 9/2021 | Grundhofer ....... G01B 11/2504 |

(Continued)

FOREIGN PATENT DOCUMENTS

| EP | 1434434 A1 | 6/2004 |
| EP | 2854400 A1 | 4/2015 |

OTHER PUBLICATIONS

Ignacio Garcia-Dorado, "Fully automatic multi-projector calibration with an uncalibrated camera," McGill University, Montreal, CA, IEEE Conference—CVPR 2011 p. 29-36.

(Continued)

*Primary Examiner* — William C. Dowling
(74) *Attorney, Agent, or Firm* — Cohen & Hildebrand, PLLC

(57) ABSTRACT

Method for automatically restoring a calibrated state of a projection system, allowing simple and error-free alignment of a projection system in an original error-free state of the system. A calibrated state of a projection system is automatically restored by calculating a position and orientation of at least one camera within the projection system, using fixed points, subsequently m times n markers (9') are projected onto the projection area, using the markers by cameras to determine a reduced number, compared with the calibration, of second measurement points (QI') that have one X, Y and Z coordinate each, the reduced number of second measurement points (QI') is used to perform a calculation of the differences between the second measurement points (QI') and the associated first measurement (Continued)

points (QI'), a displacement vector is formed, the association between the projector coordinates and 3D coordinates is adapted with the displacement vector.

4 Claims, 14 Drawing Sheets

(58) Field of Classification Search
USPC .................................................. 353/121, 122
See application file for complete search history.

(56) References Cited

U.S. PATENT DOCUMENTS

| | | | |
|---|---|---|---|
| 2005/0083402 A1 | 4/2005 | Klose | |
| 2009/0091623 A1* | 4/2009 | Krogstad | H04N 9/3185 348/189 |
| 2016/0353068 A1 | 12/2016 | Ishikawa | |
| 2016/0363842 A1* | 12/2016 | Timoner | H04N 9/3185 |
| 2020/0045277 A1* | 2/2020 | Hsiao | H04N 9/3185 |
| 2021/0192201 A1* | 6/2021 | Nguyen | G06K 9/6276 |

OTHER PUBLICATIONS

International Search Report of PCT/DE2017/000398, dated Mar. 3, 2018.
B. Sajadi, A Majumder, Autocalibrating Tiled Projectors on Piecewise Smooth Vertically Extruded Surfaces, IEEE Transactions on Visualiztions and Compouter Grpgics, vol. 17, No. 9, 2011, p. 1209-1222.
Zhang et al. "Self-recalibration of a structural light system via plane-based homography", Pattern Recognit, Elsevier, GB , vol. 40, No. 4, Dec. 14, 2006 p. 1368-1377.

* cited by examiner

METHOD FOR AUTOMATICALLY RESTORING A CALIBRATED STATE OF A PROJECTION SYSTEM

This is an application filed under 35 USC § 371 of PCT/DE2018/000327 filed on Nov. 10, 2018, claiming priority to DE 102017010683.5 filed on Nov. 17, 2017, each of which is herein incorporated by reference in its entirety.

BACKGROUND OF THE INVENTION

(1) Field of the Invention

The invention relates to a method for the automatically restoring a calibrated state of a projection system, wherein when the projection system is calibrated, m times n markers are projected onto the projection surface, from which by using one or more cameras m times n first measuring points, each having an X, a Y and a Z coordinate located on the projection surface and thus on the surface of the 3D model, are determined, and wherein an association of projector coordinates with 3D coordinates (xpypi, XYZi) and a transformation of projector coordinates into mapping coordinates $_pK_m$ and a transformation of mapping coordinates into projector coordinates $_mK_p$ is provided.

The present description relates to a calculation of geometrically correct equalizations for single- and multi-channel projections. It also relates to the determination and calculation of the geometrically correct transitions in the overlap areas of the individual projections, from which the large-area projection is generated. In particular, a strategy for automated recalibration and tracing back to an original calibration for multi-channel projections is described.

Large-area projections are mostly composed of several single projections or individual projections due to the light output and resolutions required for good visibility.

(2) Description of Related Art

Such large-area projections, which are generated by using a so-called projection system, are usually composed of several small individual projections or partial images, wherein the individual projection channels which generate the partial images are geometrically distorted and blended in a manner adapted to the projection surface. In this way, for example, a correspondingly large-area homogeneous projection or representation can be generated on the projection surface by using four projectors, with each projector generating a partial image of the large-area projection.

In order to generate a so-called seamless, large-area projection, composed, for example, of two or four individual projections or partial images, the individual projection channels must be calibrated. This process of calibrating the projection channels is also referred to as alignment.

For this calibration process, for example, predefined patterns are projected onto the projection surface. These patterns mark points on the projection surface or are designed in such a way that points can be derived therefrom. Points derived in this way can be obtained from two intersecting lines or, for example, from a corner of a flat geometric figure.

It is provided that the spatial positions (X, Y and Z coordinates) of these marked points are measured, for example by using two cameras. The overlap of the individual projectors at each point on the projection surface (screen) can be determined based on the thus obtained 3D-point model and a so-called blending (brightness adjustment) can be derived therefrom for each projector involved in the generation of the large-area projection. This particular blending can be realized, for example, by using optical aperture masks, which are arranged in the beam path of each projector.

According to the known prior art, signals of the video signals of the individual video channels of the projectors required for each partial image formation are changed after image formation by suitable processes for distorting and blending the video signals. Subsequently, the signal changed in this way is fed to a projector as an input signal, which generates the corresponding partial image on the projection surface. This process of signal processing or signal change is usually carried out for each projection channel involved in the generation of the projection, i.e. for each partial image.

Thus, the changes of the projection channels or partial images, for example for adaptation to the predetermined projection surface and/or blending, required for generating the large-area projection on a projection surface are applied directly to the input signal of each projector and hence affect the projection of the displayed partial images.

Setting up a large-area projection, consisting of several partial projections or partial images, is complex. So-called camera-based systems for setting up a projection, which have a camera that views the projection surface, considerably reduce the set-up effort. However, a camera-based system requires demanding prerequisites to achieve high quality results. The camera should be able to view the projection screen as completely as possible.

EP 1434434 A1 discloses a method for automatically calibrating a multiprojector system with at least two projectors, wherein a superimposed display with accurate pixel rendition is generated from an arbitrary number of images produced by different projectors in order to increase the overall luminosity or to enable stereographic display. Alternatively, a larger overall image comprising a plurality of individual projection images that overlap at least partially with accurate pixel rendition can also be displayed on a (large) screen. The system required to carry out the method further includes a digital camera and a control unit for controlling the projectors and the camera. According to the described method, line patterns are generated, recorded and image-filtered for automatically calibrating a multiprojector system, wherein the largest possible projection area is found and warp fields are calculated as well as image warping is performed.

This prior art solution disadvantageously does not allow a recalibration of the multiprojector system. If the position of a projector changes, the entire procedure for automatic calibration of a multiprojector system must be performed again in its entirety.

U.S. Pat. No. 6,456,339 A1 discloses a method for generating a high-resolution display. The method uses stored pixel correction information which is applied to the pixel data to be displayed and thus generates corrected or modified pixel data. This corrected or modified pixel data contains necessary distortions and/or corrections which are required for generating a composite overall picture with the aid of several projectors. It is contemplated to store the pixel data in a frame buffer and to apply the pixel correction information to the pixel data in the frame buffer before display. Alternatively, the pixel correction information is applied first and the corrected pixel data is subsequently stored in the frame buffer. The high-resolution display is then generated from the corrected pixel data. In a preferred embodiment, the system has a plurality of projectors. The pixel correction information corrects the misalignment of projected overlapping pixel arrays and ensures an error-free overlap of the projection areas to form a large-area overall projection.

In another embodiment, the projected images from multiple projectors completely overlap and the projectors have a small fill factor, resulting in a high-resolution display. To generate the pixel correction information, physical or projected test diagrams are optically detected and evaluated by a corresponding unit. An optical sensor suitable for recording the test diagrams preferably includes at least one camera, such as a CCD camera. Alternatively, the optical sensor may also include several orthogonal linear sensor arrangements.

This prior art solution disadvantageously also does not permit recalibration of the multiprojector system. If the position of a projector changes, the entire procedure for automatic calibration of a multi-projector system must be carried out again in its entirety.

When the process of the initial calibration or alignment has been successfully completed, an error-free seamless, large-area projection can be generated, so that the overlapping areas can no longer be perceived by an observer.

Such large-area projections often do not have long-time stability. Even a slight change in the orientation of a projector has a big impact on the large-area projection, the partial images drift apart. This can be caused, for example, by thermal changes in the projectors or at their supports, as well as by a required lamp change in a projector. A slight change on one or more projectors also changes the individual projection generated by the affected projector, for example with regard to its position or geometrical extent on the projection surface. In this case, a calibrated state of a projection system must be restored, also referred to as a recalibration, a new recalibration or a realignment. Here, the projection is returned to the original state after calibration so as to obtain again an error-free representation of a seamless, large-area projection.

It is possible to manually restore such a calibrated state. However, this is time-consuming and requires expert knowledge.

Camera-based systems for restoring a calibrated state are also known. The publication by B. Sajadi, A. Majumder, Autocalibrating Tiled Projectors on Piecewise Smooth Vertically Extruded Surfaces, IEEE Transactions on Visualization and Computer Graphics, Vol. 17, No. 9, 2011, p 1209-1222 describes a process for automatic calibration and recalibration of tiled projections onto piecewise smooth, vertically extruded projection surfaces, such as for example cylindrical projection surfaces or CAVEs, wherein the entire projected area is captured by a camera. First, it is checked based on comparison images whether the projection has changed, whereafter it is determined whether the change is due to a change in the positions of the projectors, of the camera and/or of the projection surface. If a change in the position of one or more projectors is detected, a pattern is projected onto the projection surface using this projector or these projectors, which is then recalibrated by comparison with the pattern recorded in the calibrated state. If a change in the position of the camera is detected, the position of the camera is determined anew. If a change in the shape or the position of the projection surface is determined, the coordinate system of the projection is redefined. The method described in the aforementioned publication is limited to piecewise smooth, vertically extruded projection surfaces.

For a good result of the restoration, camera-based systems for restoring a calibrated state require a projection surface that can be viewed by the camera in its entirety. Potential obstacles must therefore be removed for the duration of the restoration.

This restoration of a calibrated state should be carried out as quickly as possible and with a limited amount of hardware. The limitations listed below can limit the accuracy of a restoration and must be taken into account in a restoration.

If the large-area projection cannot be completely viewed by a camera in camera-based systems, the accuracy is a limited due to a view restriction. Such a restriction can be caused, for example, by structures in front of the projection surface, such as a cockpit in a flight simulator. Due to the limited view of the camera, fewer reference points may be identified on the projection surface during a restoration and therefore fewer reference points may be measured than was possible with an unobstructed view of the camera on the projection surface during the initial calibration process.

The accuracy can be further limited by inaccuracies of the newly measured markers. This limitation occurs, for example, in the event that the camera had to be arranged in such a way that it is placed outside the observer's field of vision. In this case, the camera has a very flat viewing angle on the projection surface.

For example, when only one camera is used and the camera image is fully utilized right into the corners of the camera image, the accuracy of the camera may be limited due to the lower quality of the camera optics in the peripheral areas of the lens.

A limitation of the accuracy may also be caused by a limited or inadequate resolution of the camera or the optics.

Inaccuracies in determining the position of the camera in the camera-based system, for example due to shifted reference marks such as laser markers, may also limit the accuracy.

Despite the aforedescribed limitations and the potential error sources, a system for restoring a calibrated state should again provide a large-area projection without jumps and double images, and which is also continuous and as close as possible to the original calibration or design.

The invention relates to the manner of restoring the original state or the calibrated state of the projection system.

BRIEF SUMMARY OF THE INVENTION

It is an object of the invention to provide a method for automatically restoring a calibrated state of a projection system, which enables simple and error-free alignment of a projection system in an originally calibrated error-free state of the projection system.

The object is achieved by a method having the features according to claim 1 of the independent claims. Further embodiments are recited in the dependent claims.

So-called computer-aided calibration methods for projection systems, based on design or measurement data, have in common that they require as an interim solution an association of projector coordinates with 3D coordinates on the projection surface, i.e. the screen, for example an association according to:

$(x_p i, y_p i, XYZ i)$.

This association may be a limited but dense set of point pairs, for example, 30×20 point pairs per projector.

Correction data for any mappings can then be calculated based on these data. When this association is not or no longer accurate, all correction data calculated therefrom will also be inaccurate.

The term 3D coordinates refers coordinates in a three-dimensional coordinate system with the dimensions X, Y, Z. The present description uses a spatial, uniform reference system in which the position and orientation of the individual components such as projection surface (screen), projectors, projection, cameras, etc. can be described.

Projector coordinates, also referred to as a projector-image coordinates or screen space coordinates, are two-dimensional coordinate in the image rendered by the projector with the dimensions x, y. The designations xp and yp are used here to better distinguish them from the camera coordinates.

Mapping coordinates, which are also referred to as texture coordinates, refer to a point in the content to be projected, which can be an image or a texture. These coordinates are typically two-dimensional (2D) with the coordinates u and v, but may be expanded by a further coordinate w so that, for example, volumetric texture data can be used.

The term camera coordinates or camera-image coordinates is used for two-dimensional coordinates in the camera image with the dimensions x and y. The designations xc and yc are used to better distinguish them from the projector coordinates.

Equalized camera coordinates or camera-image coordinates are two-dimensional coordinates with the dimensions x and y in an idealized camera image without distortion. The terms xc 'and yc' are used here.

The term mapping is understood to mean mapping 3D coordinates in space to 2D coordinates. This mapping is used to assign any points of the projection to a 2D coordinate. In the simple case of a planar projection along the Z axis, this would be, for example:

$$u=(X-X\min)/(X\max-X\min) \quad v=(Y-Y\min)/(Y\max-Y\min),$$

wherein X min/X max indicate the left and right mapping limits and Y min/Y max indicate the lower and upper mapping limits. This maps 3D coordinates within the mapping boundary onto normalized 2D mapping coordinates.

In the proposed restoration of a calibrated state of a projection system, it is provided that conclusions about gaps in the data of the recalibration can be drawn from a suitable combination of potentially imperfect, incomplete data from a new calibration (recalibration) with the denser, more complete data of the first initial calibration, or from the data from a design. A significantly improved calibration accuracy on the entire projection surface is thus achieved.

One reason for the creation of incomplete data and thus of a smaller or reduced number of usable measuring points during recalibration is, for example, that parts of the projection surface cannot be viewed by the one or more cameras.

Assuming that the projectors of the projection system are permanently installed and project onto a homogeneous projection surface, it can be assumed that only slight differences exist between an original projection and a later projection, which can be expressed by using a displacement vector. An order of magnitude in the range from 1/1000 to 1/10 of the individual projection size is hereby assumed.

Furthermore, it is assumed that these differences between the projections within a single projection vary only with a low frequency. Since only slight differences between the original projection and the later projection are expected with low-frequency variations, interpolation methods are particularly well suited for generalization, based on only very few point pairs that could be generated during a recalibration.

So-called multivariate or multidimensional interpolations for scattered data, also known as data on irregular grids, are used for the interpolation during recalibration for example by restricting the field of view of the camera to the projected markers rather than to the data of the measurement points. For example, "Nearest Neighbor", "Inverse Distance" or "Thin Plate Spline", without limitations thereto.

For determining the point pairs of the measurement data when restoring the calibrated state, a three-dimensional offset is used for the reduced number of measurement points available for the restoration, for example between a position of a measurement point Q with its X, Y and Z-coordinate identified during the first calibration and the position of the same measuring point Q' during recalibration, is determined as follows:

$$\text{Offset}XYZi = XYZi' - XYZi.$$

Based on 3*n data pairs:

$$(XYZi, \text{Offset}Xi)$$

$$(XYZi, \text{Offset}Yi)$$

$$(XYZi, \text{Offset}Zi).$$

Thereafter, three interpolations are determined according to:

$$\text{Offset}X(XYZ)$$

$$\text{Offset}Y(XYZ)$$

$$\text{Offset}Z(XYZ)$$

for estimating the three coordinates of a displacement vector.

By using the now determined offset functions, an estimated point XYZ' for the current point in time can be calculated for each point XYZ of the original data as follows:

$$X'=X+\text{Offset}X(XYZ) \quad Y'=Y+\text{Offset}Y(XYZ) \quad Z'=Z+\text{Offset}Z(XYZ).$$

Since the original data for each measured point also included the position in the projector space, point pairs (xpypi, XYZi') can now be calculated as follows:

$$(xpypi, XYZi+\text{Offset}(XYZi)).$$

All necessary correction data can be derived equivalent to a first calibration based on the newly determined point pairs (xpypi, XYZi').

Optimizations in the restoration of a calibrated state of a projection system will now be explained below.

A first optimization can be performed by assuming that the projection surface is unchanging or constant. Under this condition, the interpolation of the displacement vectors, which had previously required three coordinates, can then be reduced to a two-dimensional problem.

In this case, 2D points in the projector space are mapped onto 2D displacement vectors in a previously defined 2D tangential space of the projection surface. Based on 2*n data pairs $$(xpypi, \text{Offset}Ui)$$

$$(xpypi/\text{Offset}Vi),$$

two interpolations are determined for mapping the two coordinates of the displacement vectors according to:

$$\text{Offset}U(xpyp)$$

$$\text{Offset}V(xpyp).$$

A further optimization can be achieved by reducing measurement errors by taking advantage of redundancies.

As already described above, inaccuracies in the restoration of a calibrated state of a projection system can be expected due to:
- a very flat viewing angle of the camera on the projection surface,
- the use of the camera image up to the corners,
- the limited resolution of the optics of the camera, and
- inaccuracies in the determination of the camera position.

Provided that a marker viewed on the projection surface is located in the detection area of two cameras operating simultaneously or is recorded by the two cameras, the generated measurement errors can be significantly reduced.

A measurement error can be reduced, for example, by weighting measurement points derived from markers according to an expected error or an expected certainty.

Measuring points that are too imprecise can also be excluded from a further calculation. It is possible to exclude measuring points because the core concept is designed to get away with few incomplete measuring data, i.e. with a reduced number of measuring points, when restoring the calibrated state of a projection system.

The overall certainty of the individual measuring points can be put together from various evaluation criteria. In an alternative embodiment, a single evaluation criterion may also be sufficient.

For example, when using several evaluation criteria, the individual certainty evaluations may be combined by multiplication, i.e. by generating a value for an overall certainty of a measuring point as:

Overall certainty=certainty1*certainty2* . . . *certainty$N$.

An example herefor can be:

Overall certainty $i$=certainty(angle $i$)*certainty($xcyci$)
*certainty(camera resolution $i$)*certainty(camera position determination $i$).

Included in the determination of the overall certainty when evaluating a measuring point are here:
- the angle of the camera to the projection surface,
- the equalized camera coordinates xc and yc,
- the resolution of the camera, and
- the certainty when determining the position of the camera If the overall certainty i of a measuring point determined in this way is less then a certain predetermined threshold, this measuring point can be excluded from further processing or discarded. If the overall certainty i of a measuring point determined in this way is greater than the predetermined threshold, this measuring point is used when restoring a calibrated state of a projection system.

If a measuring point has been measured from n different camera positions, for example when using n cameras at the same time, the different measured values can be combined according to their respective certainty:

Measuring point=(measuring point*certainty+measuring point2*certainty2+ . . . +measuring point$N$*certainty$N$)/(certainty)+certainty2+ . . . +certainty$N$).

In this way, a measuring point with a significantly reduced measuring error is generated.

Further details, features and advantages of embodiments of the invention can be ascertained from the following description of exemplary embodiments with reference to the appended drawings, which show in:

DETAILED DESCRIPTION OF THE INVENTION

Figure 1:
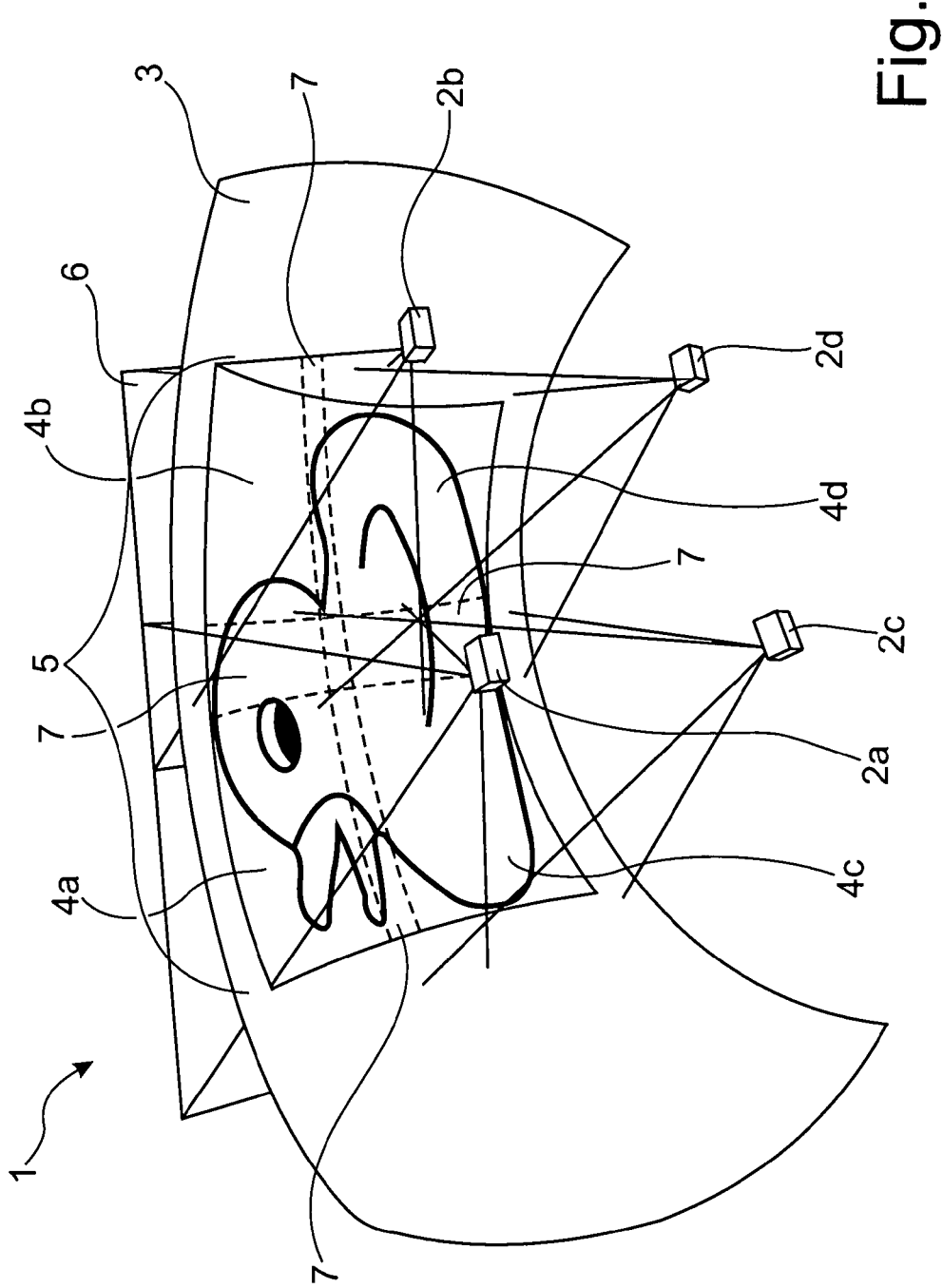
FIG. 1: a schematic representation of a large-area projection on a curved projection surface using several projectors.

FIG. 1 shows a projection system 1 which has by way of example four projectors 2a, 2b, 2c, 2d. Each projector 2a, 2b, 2c, 2d generates a respective partial image 4a, 4b, 4c, 4d on the projection surface 3, which, when put together, result in a large-area projection 5. This large-area projection 5 is generated by creating between two adjacent partial images 4a, 4b, 4c, 4d a blend zone 7 in which image portions of the adjacent partial images 4a, 4b, 4c, 4d overlap. The image or video signals of the partial images 4a, 4b, 4c, 4d required for controlling the projectors 2a, 2b, 2c, 2d are generated in a suitable central signal generation unit, which is not described in detail here, since it has no effect on the embodiments of the present invention.

The required partial images 4a, 4b, 4c, 4d are originally generated in the signal generation unit in such a way that the large-area projection 5 projects with an error-free rendition only onto a flat projection surface 6, which is shown for a better visualization in FIG. 1.

To enable an error-free display on the curved projection surface 3, the entire projection system 1 is calibrated. During this calibration, data are generated which make it possible to distort the partial images 4a, 4b, 4c, 4d in such a way that they are displayed to an observer on the curved projection surface 3 and perceived by the observer faithful to the original without undesired displacements or distortions. In addition to this distortion of the partial images 4a, 4b, 4c, 4d, the signals of the partial images 4a, 4b, 4c, 4d are also changed so as to be superimposed in the blend zones 7 with such accuracy that the observer can no longer perceive the partial images 4a, 4b, 4c, 4d individually or separately from one another, which then appear as a contiguous, large-area projection 5. For this purpose, blending, i.e. an adaptation of the brightness of the partial images 4a, 4b, 4c, 4d within the blend zones 7 must also be performed.

Figure 2:
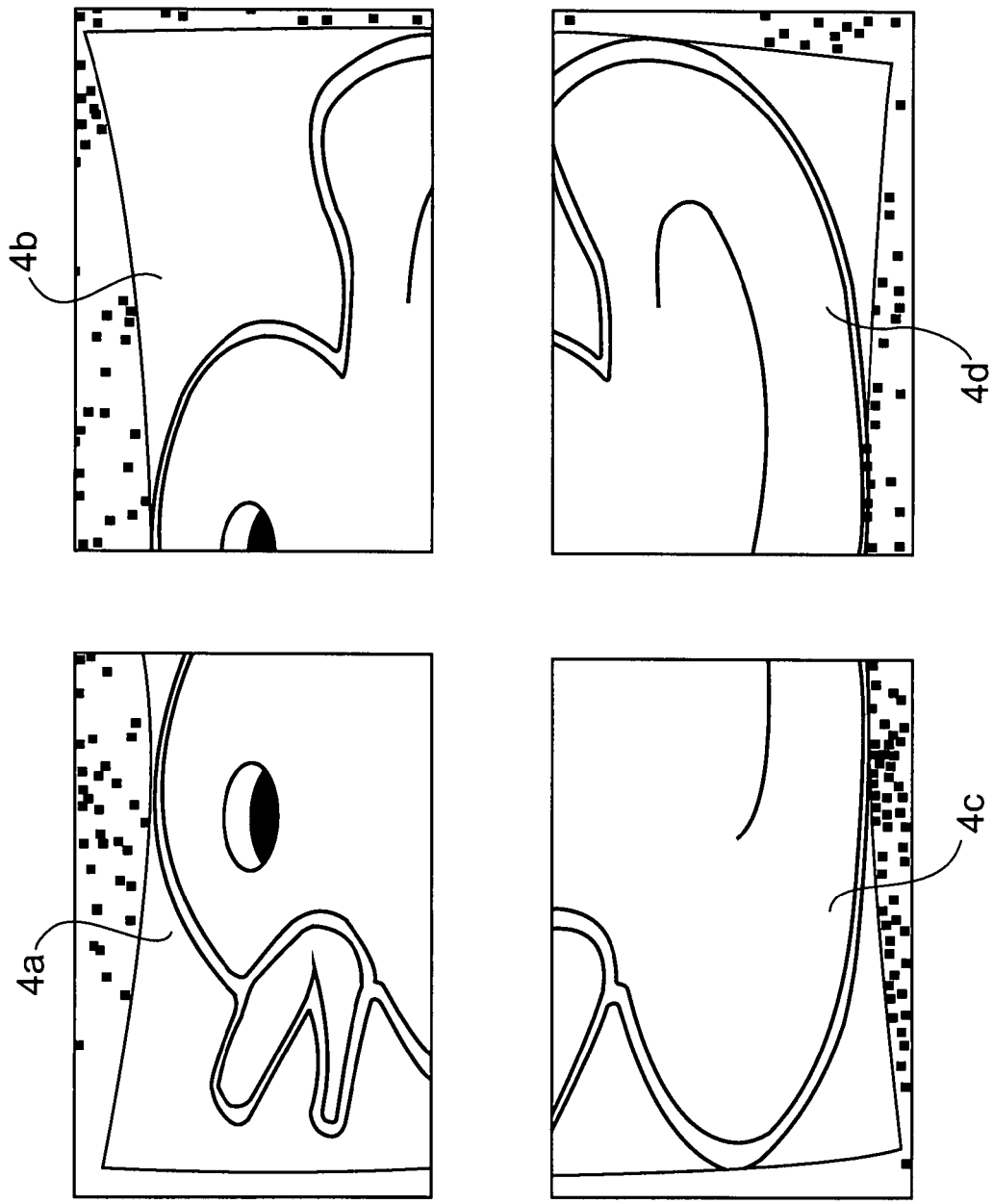
FIG. 2: an exemplary representation of the partial images of the large-area projection.

FIG. 2 shows each of the partial images 4a, 4b, 4c, 4d of the large-area projection 5 as individual images. It can be clearly seen, for example, from the partial images 4a and 4b that the partial images 4a and 4b can only bring about an error-free image when they partially overlap on their common side. The example of the partial images 4a and 4b clearly shows that the eye of the illustrated duck must be made to coincide in order to obtain an error-free, large-area projection 5.

A projection system 1 is set up and operated, for example, in the following steps:
1. measurement
2. projection design
3. construction design
4. alignment
5. setup
6. renewed/retroactive calibration (realignment).

Measurement refers measuring the projection surface 3 used for the projection and determining possible positions of the projectors 2 required for the projection of the large-area projection 5. This measurement is used to create a first constructive model of the projection system 1. A projection design is then created based on this first constructive model of the projection system 1. Using this created projection design, specifications such as a projector type, resolution, possible optics and brightness can be determined and checked. If the projection design meets the criteria predetermined for the projection system, the model of the projection system 1 is implemented in practice, i.e. the construction design is implemented in practice.

Figure 3:
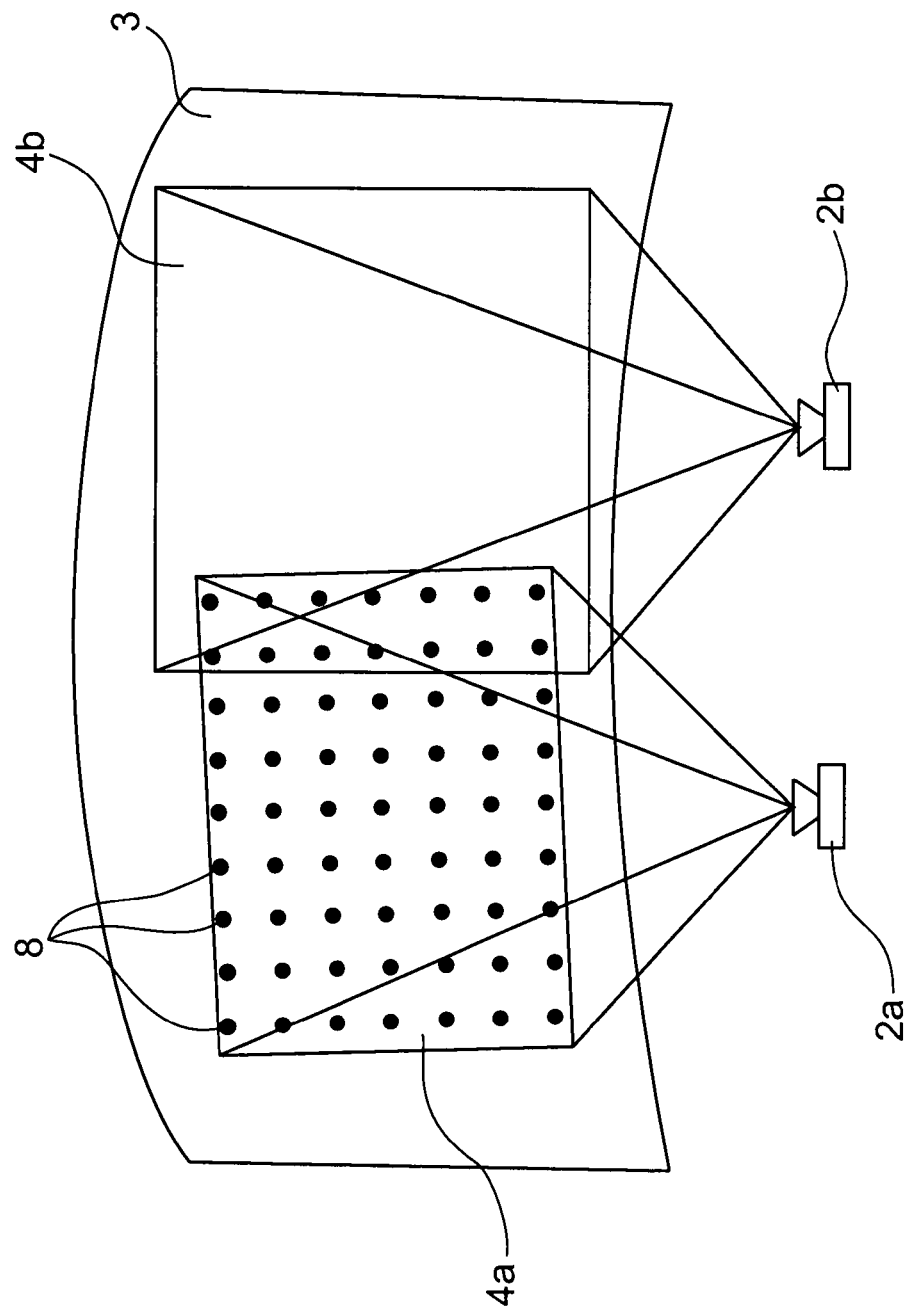
FIG. 3: a projection of markers on the projection surface for calibrating the projection system.
Figure 4:
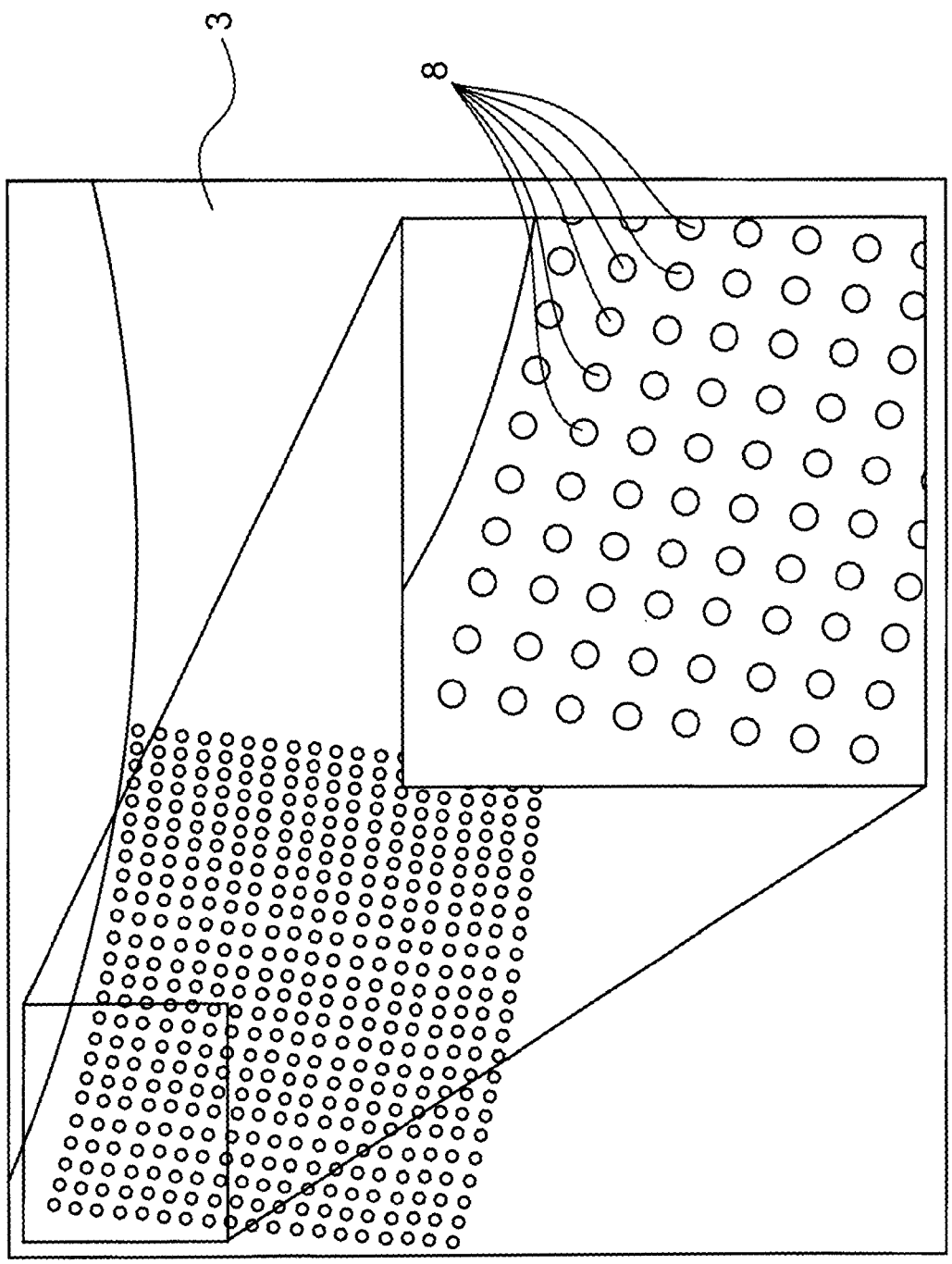
FIG. 4: a partially enlarged representation of the markers on the projection surface from FIG. 3, FIG. 5 a representation of a generated 3D model of the projection surface with model measuring points M and measuring points Q.

After the projection system 1 has been set up in practice and finally arranged and all image signals are stably transmitted, an alignment of the projection system 1b can commence. The image signals can be transmitted, for example, using standards such as DVI, HDMI or DisplayPort. For this calibration (alignment) process, m times n markers 8, such as circles or crosses, are projected onto the projection surface 3 for each projector 2a, 2b, 2c, 2d, as shown in FIG. 3. For example, m corresponds to a number of the markers 8 projected in one line, while n indicates the number of lines of the markers 8 in an m by n matrix. In the example of FIG. 3, the markers 8 are shown in 7 lines, each line having 9 markers 8 per line. Thus, in this example, m=9 and n=7. These markers 8 projected in a matrix are clearly indexed, for example by a gray code, and captured by a camera. Provided that a 3D model of the projection surface 3 has already been created, these markers 8 can be translated to a measuring point 9 Q. These measuring points 9 Q have a specific position on the projection surface 3, each with an X, Y and Z coordinate. FIG. 3 shows in form of an overview and in FIG. 4 in an enlarged detail an example of such markers 8, for example of a projector 2a. FIG. 4 shows in the lower right area an enlarged detail of the projection surface 3 from the upper left part of FIG. 4.

The position and orientation of the camera 12 is first calculated for each camera position in a so-called world coordinate system based on fixed points. Fixed points are prominent points in the field of view of the camera (s) 12, the positions of which have been previously determined in the world coordinate system. This can be done, for example, using a theodolite, a Disto or photogrammetry.

Figure 5:
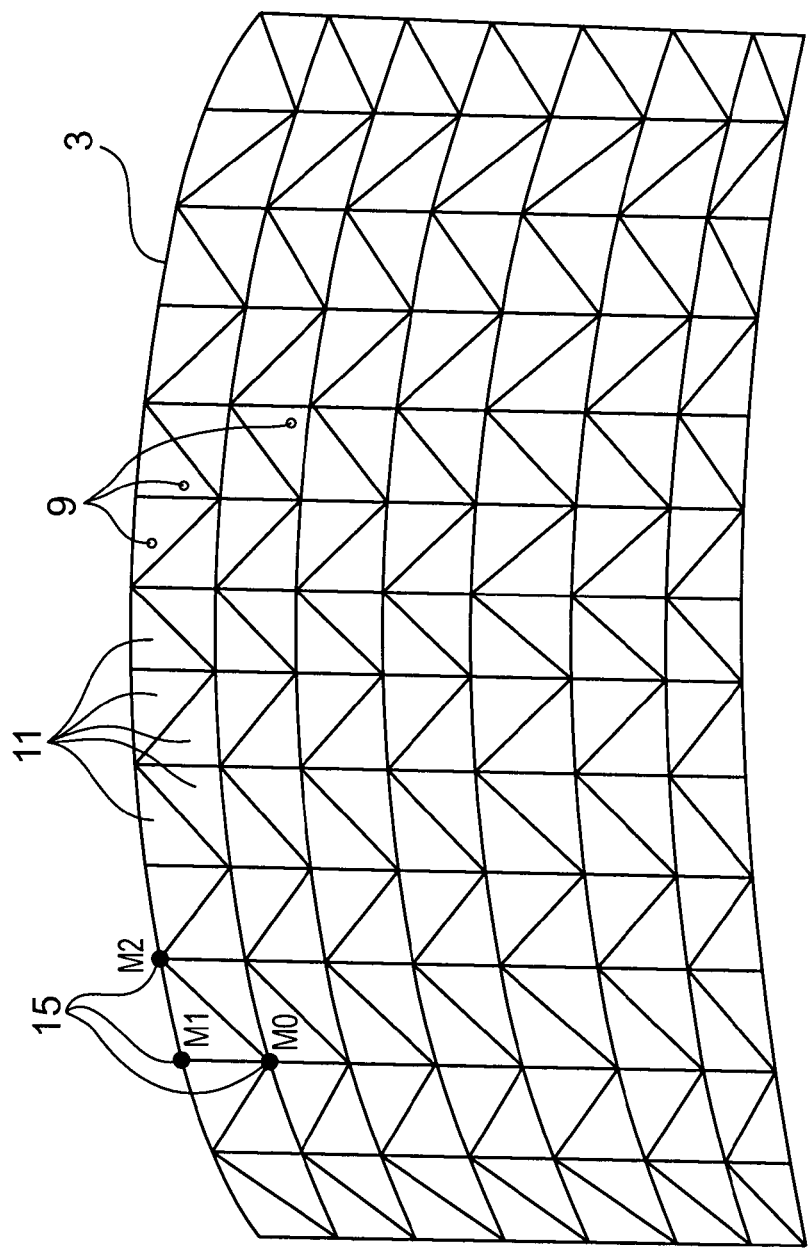

By recording a projected marker 8 with a camera 12 arranged in the projection system 1 from, for example, two different positions, the 3D coordinates of a measuring point 9 Q ($Q_n$, $Q_1$, $Q_2$, ..., $Q_n$) are calculated from the marker 8 using a so-called forward intersection. Advantageously, two cameras 12a and 12b can also be arranged in the projection system 1, wherein, for example, a marker 8 can be simultaneously recorded from two different positions. With the aid of these calculated measuring points 9 Q ($Q_n$, $Q_1$, $Q_2$, ..., $Q_n$), a 3D model of the projection surface 3 can be created and used in the further course of the method. Each of these measuring points 9 Q has its own X, Y and Z coordinate and can thus be unambiguously represented both on the projection surface 3 and in the 3D model derived from the projection surface 3. To reduce the number of measuring points 9 Q required to describe the surface of the projection surface 3 in the 3D model, the surface in the model was arranged or divided into partial areas 11. These partial areas 11, which can be for example triangles or other polygons, are each formed by three or more corner points or model measuring points 15 M and describe the surface of the projection surface 3 with sufficient accuracy. FIG. 5 shown such a representation of a 3D model of the projection surface 3 constructed from, for example, triangles 11. The illustration shows an exemplary triangle 11 with the corner points $M_0$, $M_1$ and $M_2$.

The 3D coordinates of the three-dimensional model (3D model) of the projection surface 3 obtained by triangulation reproduce the real projection surface 3 with sufficient accuracy and usually differ from an ideal flat projection surface 6.

A 3D model required with the present method can thus be derived, as already described above in a first variant, from the markers 8 projected onto the projection surface 3.

Alternatively, it can be assumed in a second variant that an area of a partial area of the projection surface 3 corresponds to a sphere or a cylinder so that a corresponding 3D model of a sphere or a cylinder can be used.

In a third variant for generating a 3D model of the projection surface 3, the projection surface 3 is accurately measured or scanned point-by-point using a laser scanner or a theodolite.

In addition, each projector 2a, 2b, 2c, 2d may be calibrated once so that the partial images of each projector 2a, 2b, 2c, 2d can be associated with a partial area on the projection surface 3.

The next step involves setting up the overall projection. In principle, a distinction can be made between two applications:
1. Simulation of a 3D Environment Setting up the viewing point (eyepoint), the orientation and the opening angle (frustum) of the virtual camera(s), which is/are positioned at the viewing point.
2. Video Setting up the mapping coordinate system and adjusting the position and orientation of the individual image segments (cutting rectangles) for each projector.

Starting from
viewing point, orientation and opening angle of the virtual camera, or
the mapping coordinate system, location and orientation of the image sections, 2 transformations are calculated:
$_p k_m$ (projector coordinates→mapping coordinates)
$_m k_p$ (projector coordinates←mapping coordinates).

When determining the transformations $_p k_m$ and $_m k_p$, which are also referred to as transformation determination or interpolation determination, generalized interpolations are determined from known coordinate pairs, such as xpypi and uvi, in the different coordinate systems (projector coordinates, mapping coordinates), from which the transformation function $_pk_m$ and $_mk_p$ can be estimated for arbitrary coordinates. For this purpose, common interpolation methods such as polynomials or cubic splines can be used. These interpolation methods approximate very closely the actual transfer function when correspondingly dense measuring points exist and the function is continuous between them. The estimate becomes worse with increasing distance between the measuring points or outside the measuring range.

Both transformations can be used sequentially to transform projector coordinates into mapping coordinates ($_pk_m$) and mapping coordinates into projector coordinates ($_mk_p$). These two transformations form the basis for all subsequent calculations.

The blend zone 7 refers to the area or the overlap zone between the individual partial images 4a and 4b of the individual projectors 2a and 2b. For both applications (simulation of a 3D environment or video), the blending is calculated in a mapping coordinate system. The gray values of the blending for each individual projection are calculated commensurately.

Figure 6:
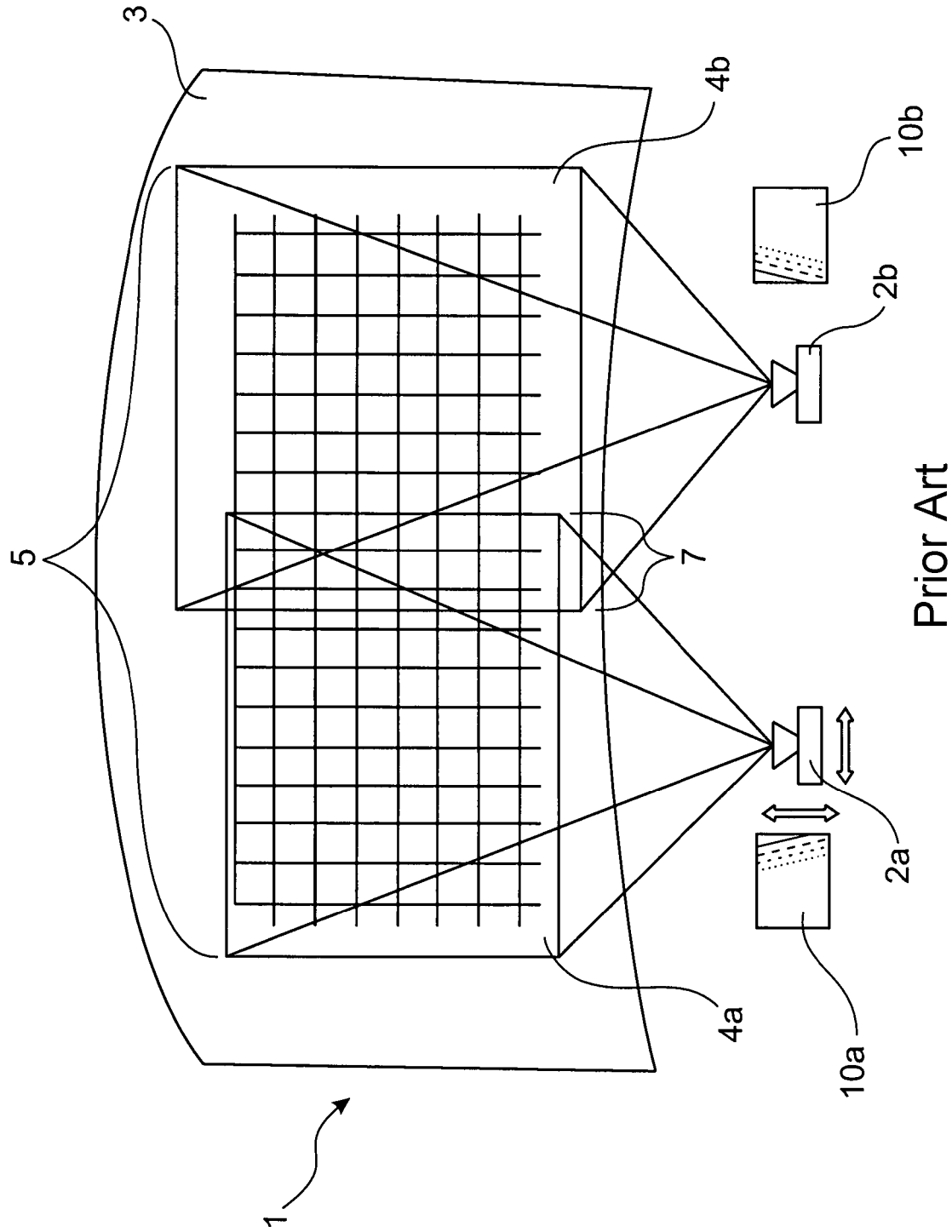
FIG. 6: a representation of an error-free, large-area projection after calibration of the projection system.

After the projection is calibrated and set up, a contiguous, large-area projection 5 is created depending on the application (simulation of a 3D environment or video). FIG. 6 shows an example of a projection system provided in this way. FIG. 6 shows a projection system 1 with two projectors 2a and 2b, which generate the partial images 4a and 4b. The projectors 2a and 2b have been aligned and adjusted by calibrating and setting up the projection system 1 such that the projected partial images 4a and 4b produce a large-area projection 5 on the projection surface 3, in which the transition between the partial images 4a and 4b in the blend zone 7 can no longer be perceived. FIG. 6 also shows, by way of example, the aperture masks 10a and 10b used for the projection of the partial images 4a and 4b, which can be arranged in the beam path of the respective projector 2a and 2b. FIG. 6 shows a representation of a grid generated on the projection surface 3 by both projectors 2a and 2b.

Figure 7:
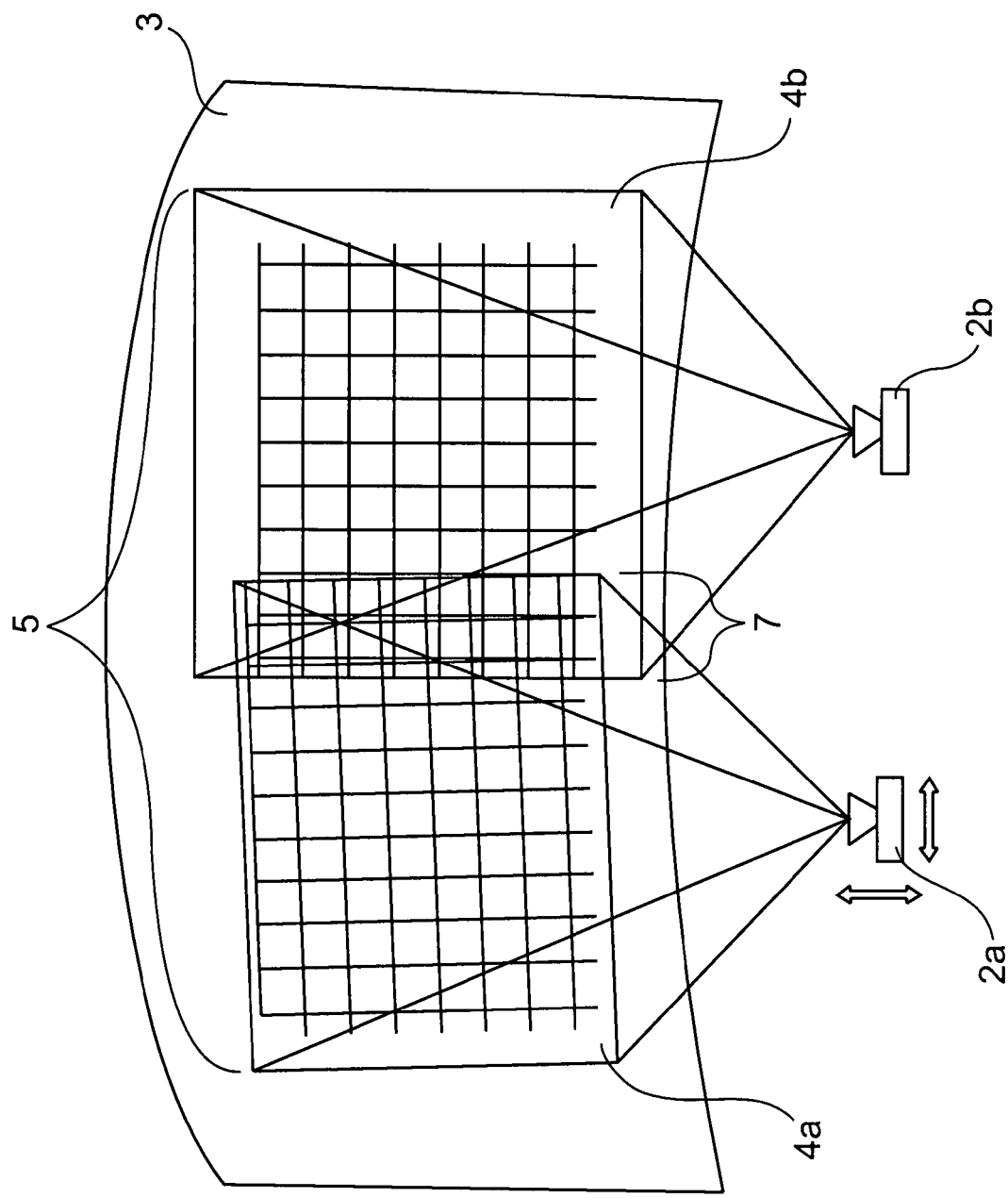
FIG. 7: an incorrect projection of a partial image after a change in position of a projector.

A lamp change required in a projector 2, thermal drift or other external influences can lead to a change in the position and/or the orientation of one or more projectors 2a, 2b, 2c, 2d. These changes, which in some cases are only minimal, are visible in the large-area projection 5, for example, as double images. Such a modified projection is shown in FIG. 7. In the example of FIG. 7, the position of the left projector 2a has been shifted. This change in the position of the projector 2a causes a change in the orientation and/or position of the projection of the partial image 4a. This can be clearly seen in particular in FIG. 7, because the grid patterns of the partial images 4a and 4b no longer match in the blend zone 7 of the large-area projection 5.

The state of the original calibration and setup must be restored by a new or reverse calibration or realignment of the projection system 1. To accomplish this, the following requirements and steps are required:

3D coordinates (measuring points $M_0, M_1, M_2, M_n$) of the three-dimensional model (3D model) of the projection surface 3 obtained by triangulation or alternatively of another 3D model of the projection surface 3 with a sufficiently high accuracy. The generation of such a 3D model shown in FIG. 4 has already been described above.

A sufficiently large part of the projection area 3 is viewed by at least one or more cameras. It must be ensured here that the partial images 4a, 4b, 4c, 4d of the projectors 2a, 2b, 2c, 2d are at least partially seen by at least one camera 12. It is advantageous if the position and orientation of the one or more cameras are already known. Alternatively, the position and orientation can be determined in a separate process step.

The recalibration or realignment of the projection system 1 can subsequently be carried out in several method steps:

In a first method step, the position and orientation of the (realignment) camera(s) within the projection system 1 are calculated in the event that this information is not yet available. For this purpose, so-called fixed points are used, which are located in the detection area of a camera and whose position is known in a so-called world coordinate system (origin coordinate system) with associated X, Y and Z coordinates. LEDs, laser points, coded markers or prominent objects within the detection range of the camera can be used as fixed points. These are detected by the camera, and the position and orientation of the camera can be calculated based on these fixed points.

In a second method step, the uniquely indexed markers 8 for each projector 2a, 2b, 2c, 2d and for each camera arranged in the area of the projection system 1 are re-projected and identified.

When a multi-camera system with at least two cameras is used, each camera sees only part of the projection, for example. The projectors 2a, 2b, 2c, 2d generating these partial images 4a, 4b, 4c, 4d must project the corresponding patterns of the markers 8, see for example FIGS. 3 and 4.

Figure 8:
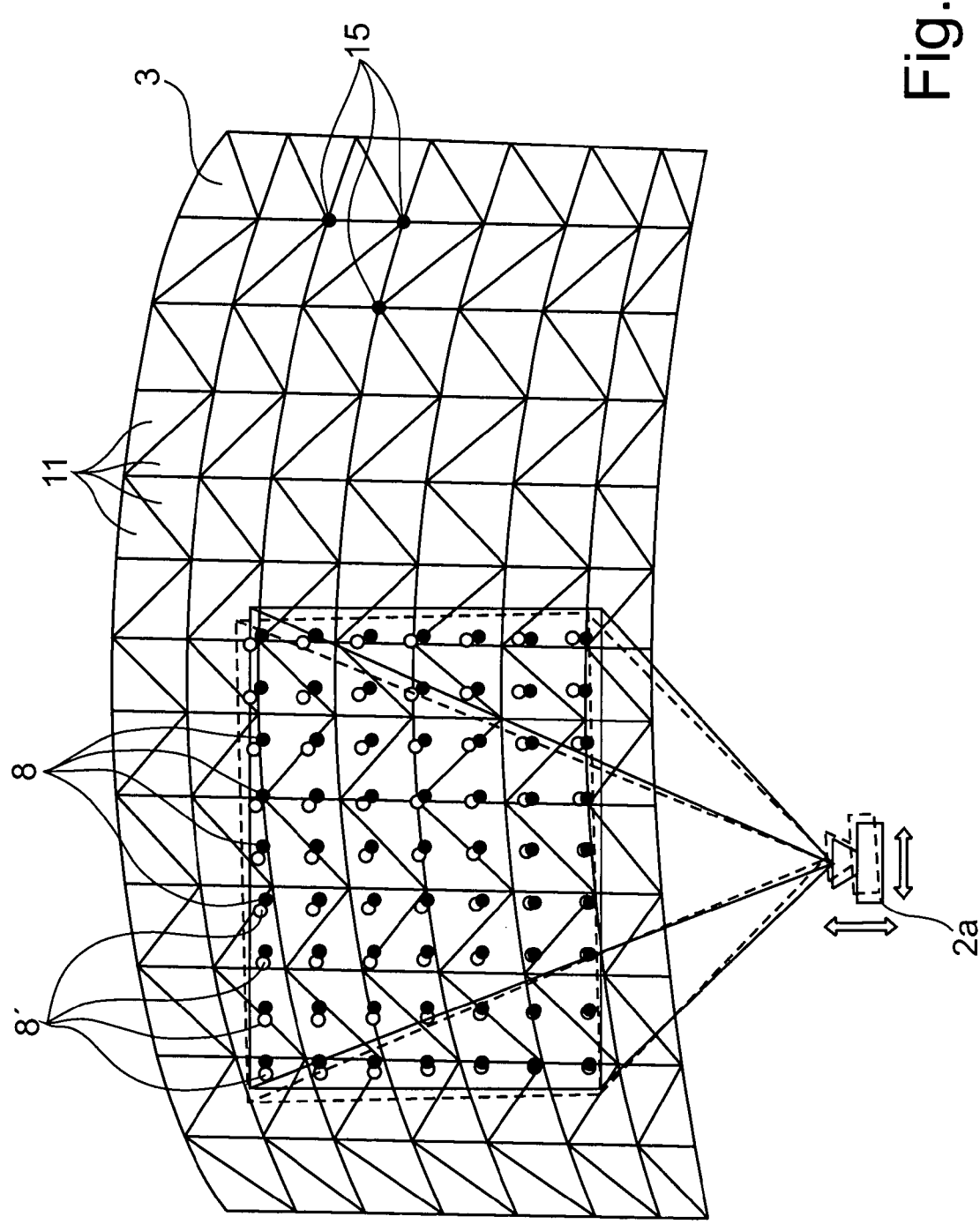
FIG. 8: a comparison of the projection of markers on the projection surface for calibrating the projection system before and after a change in position of a projector.

FIG. 8 shows an example of a projection of patterns or markers 8 on a projection surface 3 in an original and a shifted state, in which the position of the projector 2 has changed. While the original markers 8 are identified by the reference number 8, the shifted markers 8' generated by the change in position of the projector 2a are identified by an apostrophe after the number.

Figure 9:
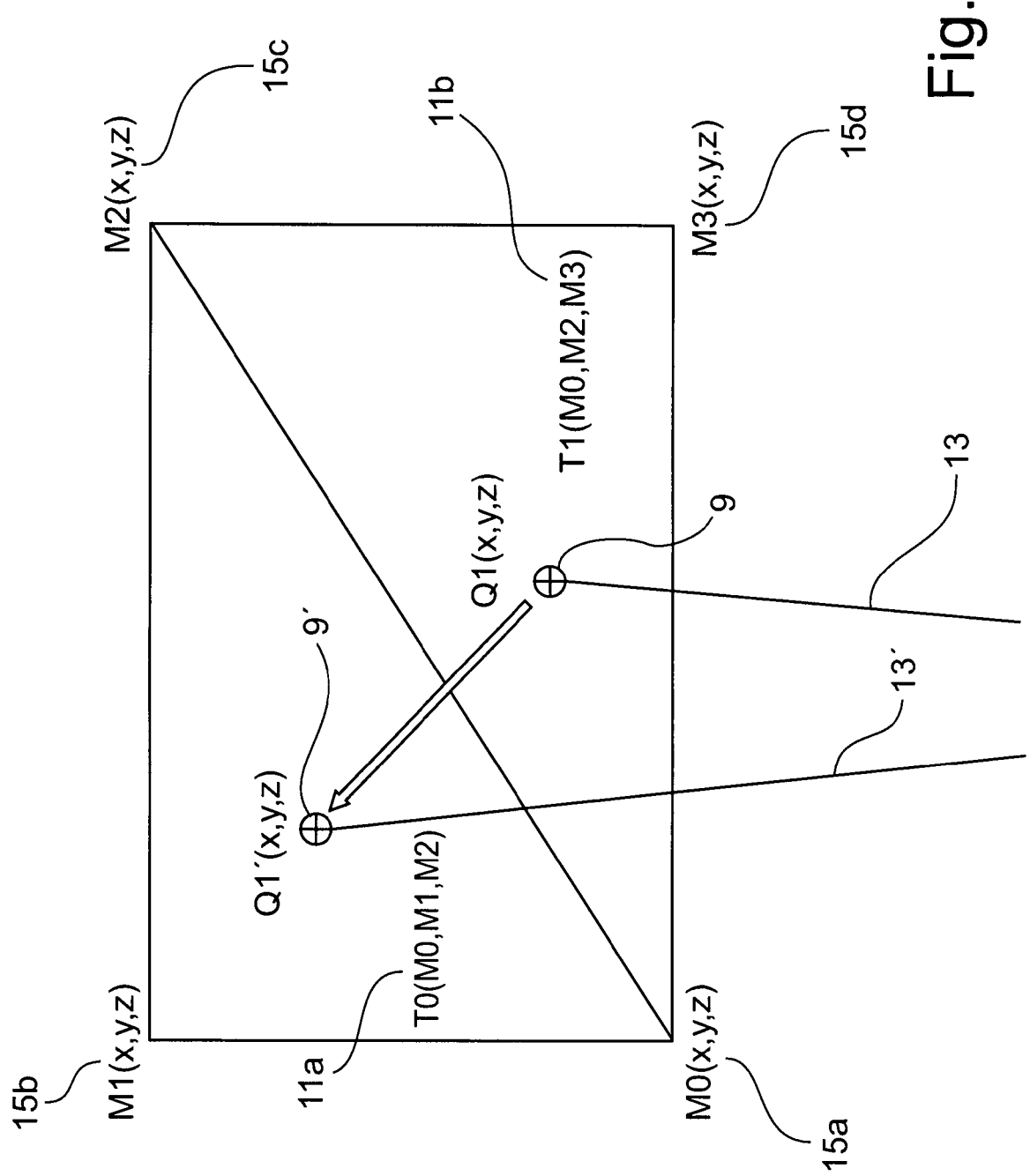
FIG. 9: a partial comparison of the projection of a marker on the projection surface before and after a change in position of a projector.

FIG. 9 shows a detail of a marker from FIG. 8. According to the model shown in FIG. 5, only two partial areas 11a and 11b are shown for an explanation. The first partial area 11a, designated as $T_0$, is formed by the model points 15 having the designations $M_0$, $M_1$ and $M_2$. The second partial area 11b, designated as $T_1$, is formed by the model points 15 having the designations $M_0$, $M_2$ and $M_3$.

A measuring point Q1 is shown, which has X, Y and Z coordinates and which has been detected from the marker 8. Also shown is a measurement point Q1' 9 with different X, Y and Z coordinates which has been detected from the marker 8', due to the change in position of the projector 2a. The resulting change in the detected position of the measuring points $Q_1$ and $Q_1'$ is indicated by the arrow. Also shown is the original line of sight 13 of a camera 12 on the marker 8 and the changed line of sight 13' of the camera 12 on the marker 8' after the position of the projector 2a changed.

Figure 10:
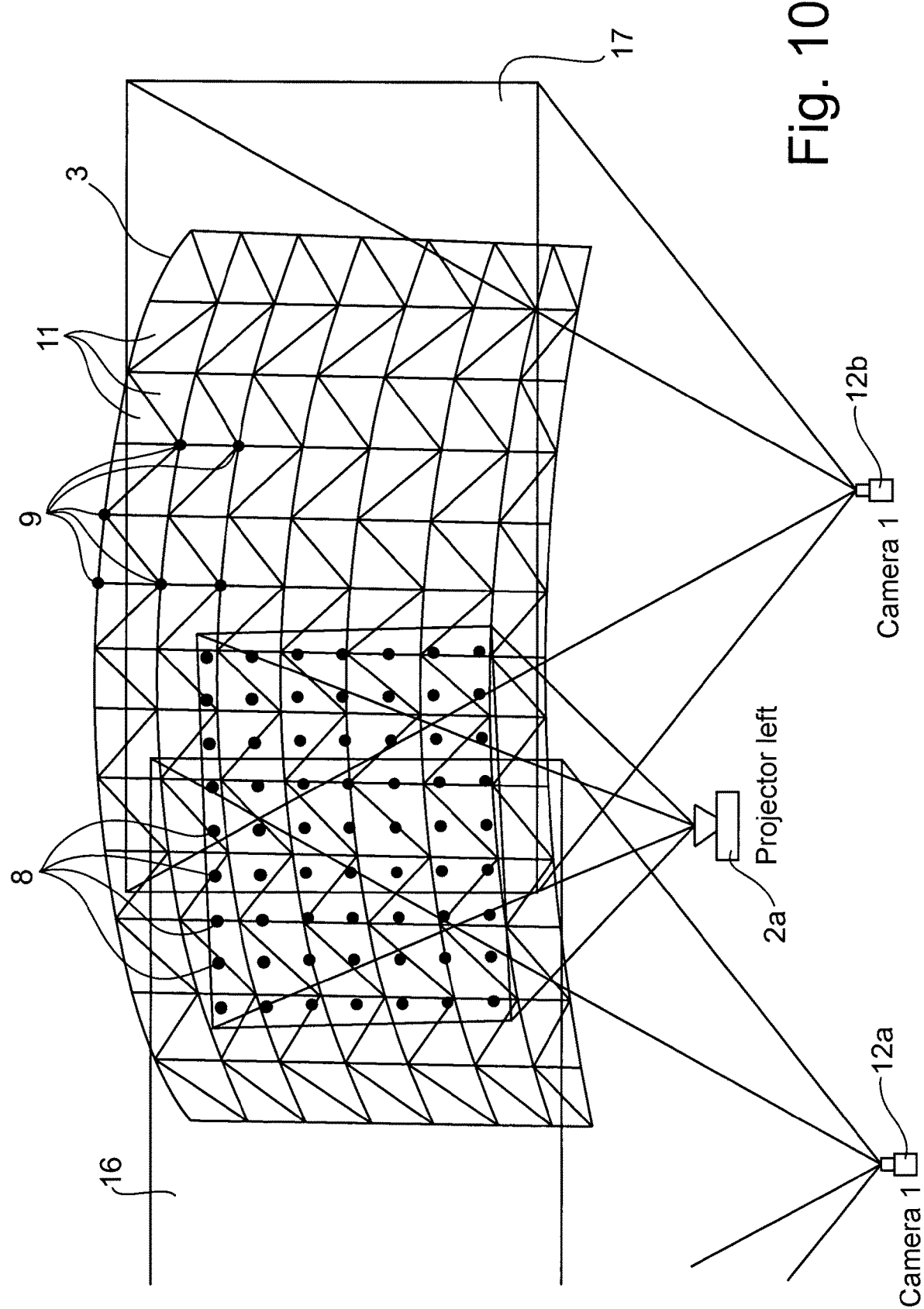
FIG. 10: a projection system with two cameras for recording the markers projected on the projection surface.

FIG. 10 shows an example of a projection system 1 in which two exemplary cameras 12a and 12b are installed. The detection areas 16 and 17 of the respective cameras 12a and 12b are aligned, i.e. oriented, with the projection surface 3 and allow at least a partial recording or capture of this projection surface 3.

In this way, a reduced number of measuring points Q' compared to the first calibration is generated, which is available for restoring a calibrated state of a projection system. To determine the point pairs of the measurement data, a three-dimensional offset of the new calibration is now determined for the reduced number of measurement points:

$$\text{Offset}XYZi = XYZi' - XYZi.$$

Based on 3*n data pairs, one obtains:

(XYZi,OffsetXi)

(XYZi,OffsetYi)

(XYZi,OffsetZi).

Thereafter, three interpolations are determined according to:

OffsetX(XYZ)

OffsetY(XYZ)

OffsetZ(XYZ)

to estimate the three coordinates of a displacement vector.

With this determined offset function, an estimated point XYZ' can be calculated for the current point in time for each point XYZ of the original data as follows:

$X'=X+OffsetX(XYZ)Y'=Y+OffsetY(XYZ)Z'=Z+OffsetZ(XYZ)$.

Since the original data also included for each measured point the position in the projector space, point pairs (xpypi, XYZi') can now be calculated as follows:

(xpypi,XYZi+Offset(XYZi)).

Based on the newly determined point pairs (xpypi, XYZi'), all necessary correction data can be derived equivalent to an initial calibration.

In such way, corrected transformations $_pk_m$ and $_mk_p$ are provided for generating the partial images 4a, 4b, 4c, 4d for each projector 2a, 2b, 2c, 2d.

After the new or trace-back calibration or realignment of the projection system 1 is complete, the state of an error-free projection of the large-area projection 5 shown in FIG. 6 is restored.

In the event that the entire projection surface 3 cannot be adequately viewed by a single camera 12, pictures from different positions within the projection system 1 must either be taken with the one camera 12 or several cameras 12a and 12b located at different positions must be used. Suitable position of the cameras 12 within the projection system 1 can be positions for the cameras 12, from which a view of the corresponding section of the projection surface 3 is unobstructed. For example, a camera 12 can be arranged next to or at an angle behind a projector in the projection system 1, as shown by way of example in FIG. 10.

Because the calculation of the position and the orientation of the cameras according to the first variant is in most cases not precise enough due to existing tolerances, different strategies can be used to optimize the determined quantities and thus to optimize the projection. Each of these optimizations can be used severally or in combination.

Figure 11:
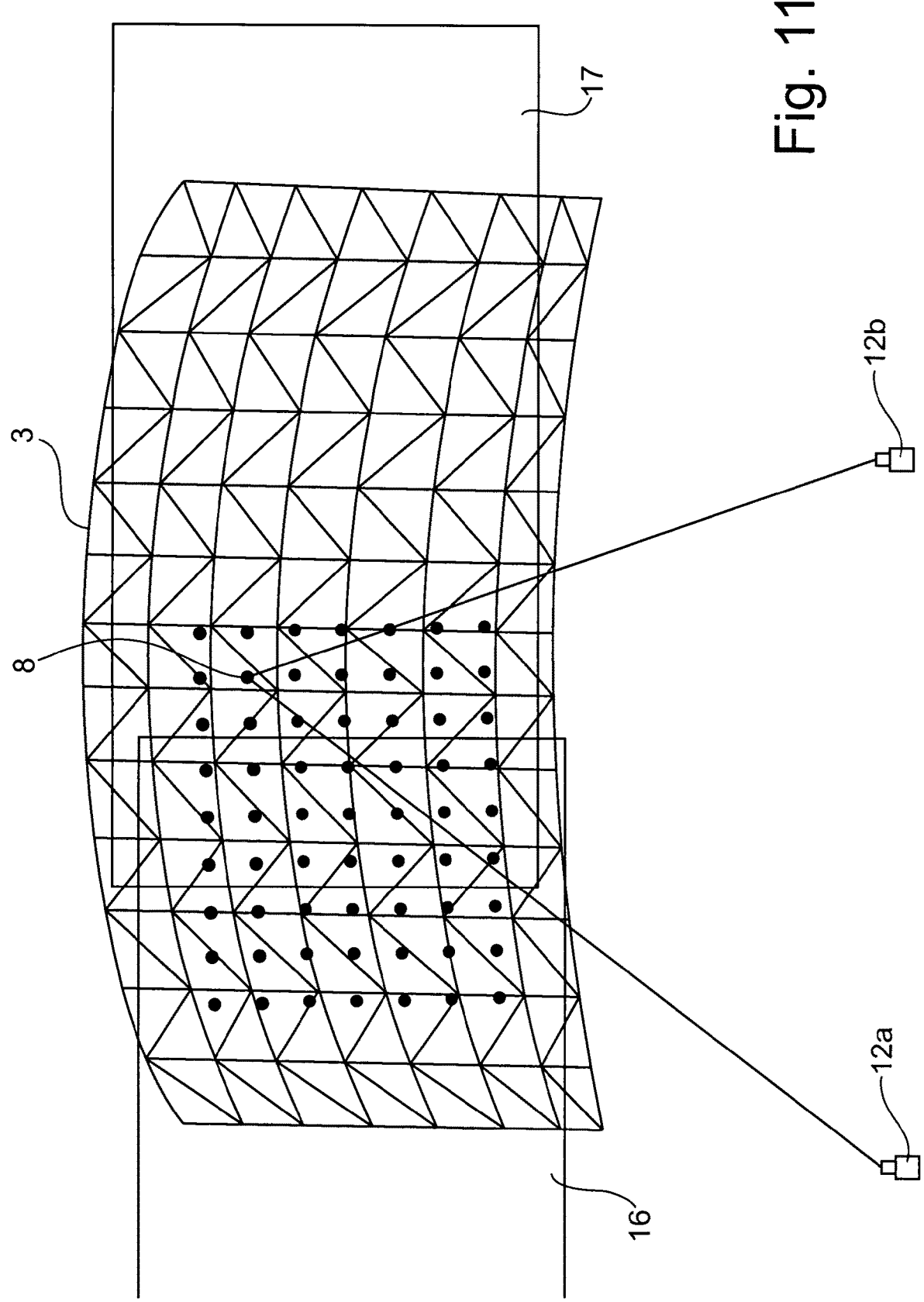
FIG. 11: an illustration of a recording of a marker projected onto the projection surface using two cameras from different positions.

When a marker 8 is detected with one or two cameras from two positions, as shown in FIG. 11, an average of these two detected 3D coordinates $Q_{cam0(x, y, z)}$ and $Q_{cam1(x, y, z)}$ is formed in a first optimization. This can be done, for example, by arithmetic averaging, wherein the average value $Q_{average(x, y, z)}$ is formed. When forming the average value $Q_{average(x, y, z)}$, the different 3D coordinates $Q_{cam0(x, y, z)}$ and $Q_{cam1(x, y, z)}$ derived from a marker 8 are added and divided by the number of detected 3D coordinates. The average 3D coordinate value $Q_{average(x, y, z)}$ of this one marker 8 is used thereafter. Such an optimization by forming of average value is shown in FIG. 12.

Figure 12:
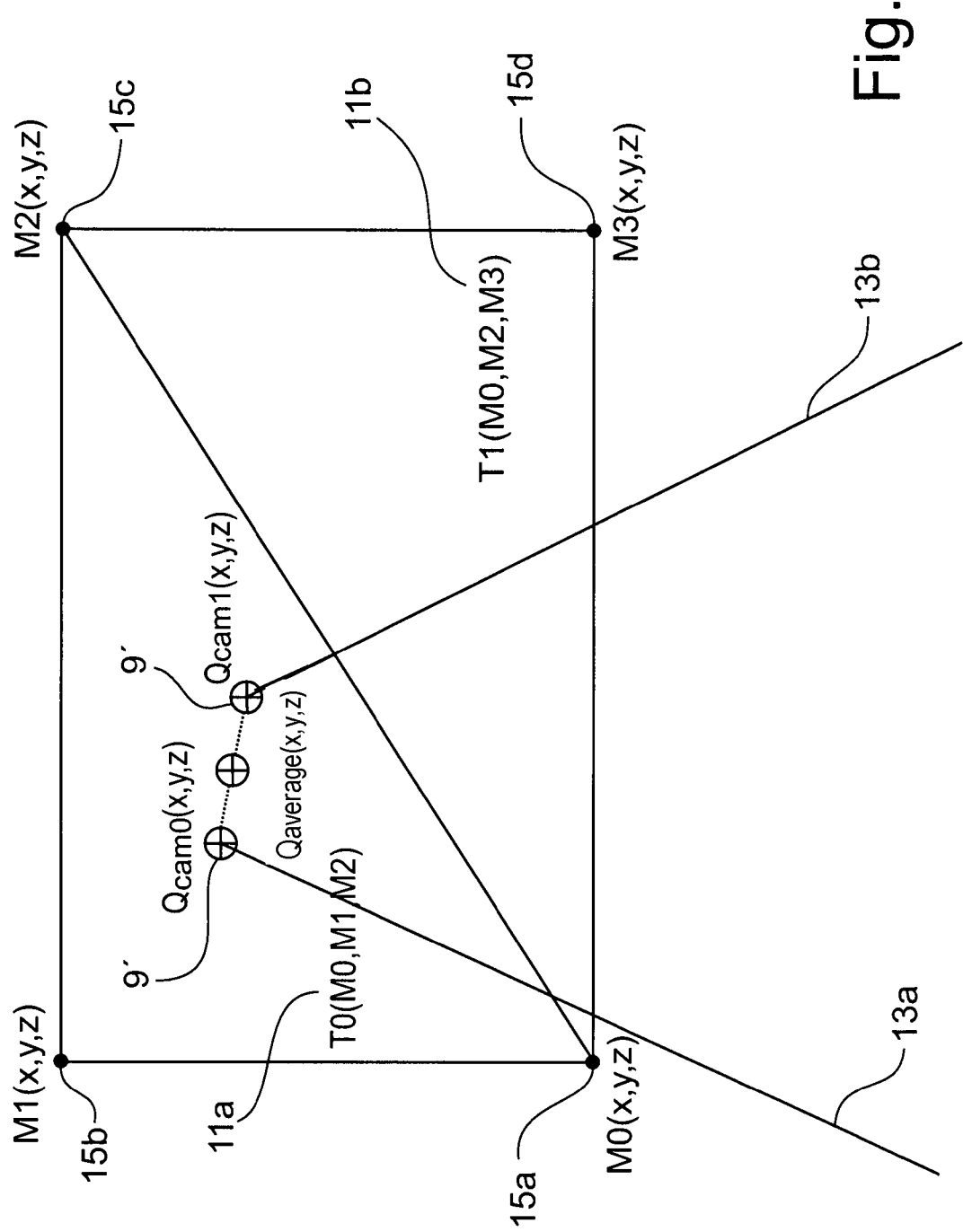
FIG. 12: an optimization of the 3D measuring points $Q_{cam0}$ and $Q_{cam1}$ determined with two cameras by averaging.

FIG. 12 shows a detail of the projection surface 3 with two partial areas 11a ($T_0$) and 11b ($T_1$) describing the detail.

Here, the first triangular partial area 11a is formed by the model points $M_0$, $M_1$ and $M_2$, and the second triangular partial area 11b is formed by the model points $M_0$, $M_2$ and $M_3$. A marker 8 projected, for example, in the area of the first partial area 11a is detected by the first camera 12a at the measuring point $Q_{cam0(x, y, z)}$, in accordance with the line of sight 13a. The same marker 8 is detected by the second camera 12b at the measuring point $Q_{cam1(x, y, z)}$ in accordance with the line of sight 13b. According to the described optimization by averaging, the measuring point $Q_{average(x, y, z)}$ is calculated, which is located between the measuring points $Q_{cam0(x, y, z)}$ and $Q_{cam1(x, y, z)}$, as shown in FIG. 12.

According to a further possibility for optimization, a decision is made as to which of the 3D coordinates of a marker 8 captured by the cameras 12a and 12b is to be subsequently used, depending on the weighting of a position of the respective camera 12a or 12b.

Figure 13:
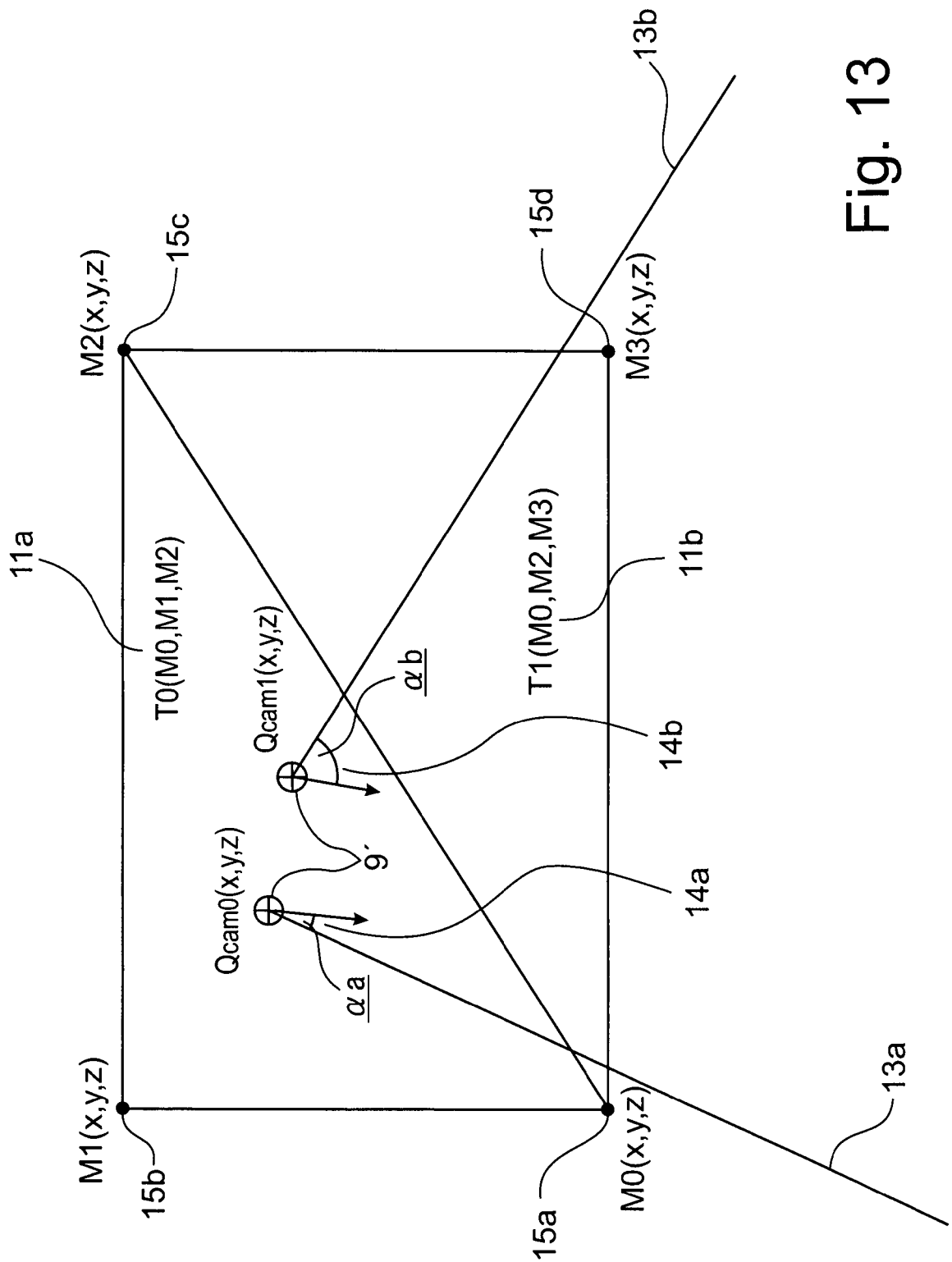
FIG. 13: an optimization of the determined 3D measuring points by weighting the angle α.

The criterion for this weighting is the angle $\alpha_a$ 14a or $\alpha_b$ 14b, which results between the respective line of sight 13a of the camera 12a or the line of sight 13b of the camera 12b and the projection surface 3, as shown in FIG. 13.

FIG. 13 again shows a detail of the projection surface 3 with two partial areas 11a and 11b describing the detail. Here, the first triangular partial area 11a is formed by the model points $M_0$, $M_1$ and $M_2$, and the second triangular partial area 11b is formed by the model points $M_0$, $M_2$ and $M_3$.

In this further optimization, the precision of the calculation of the measurement point 9 decreases when the angle $\alpha$ becomes smaller. Such an optimization by weighting the angle $\alpha$ 14 is shown in FIG. 13 with the aid of a line of sight 13a of the camera 12a and a line of sight 13b of the camera 12b. As can be seen, the angle $\alpha_a$ 14a for the line of sight 13a is smaller than the angle $\alpha_b$ 14b for the line of sight 13b. The measurement point 9 $Q_{cam0(x, y, z)}$ detected by the camera 12a is thus assigned a higher accuracy and is used for subsequent calculations.

Figure 14:
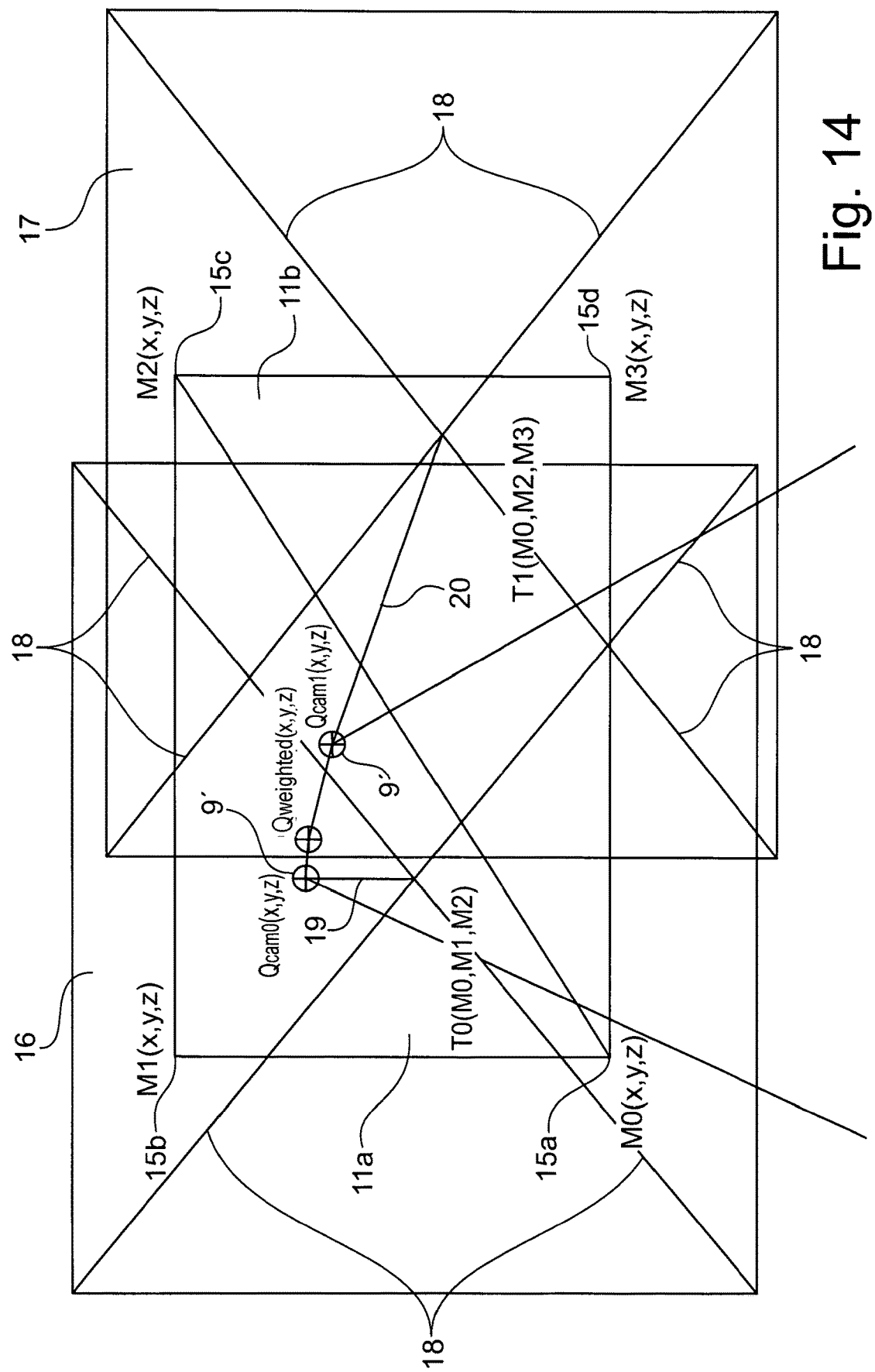
FIG. 14: an optimization wherein the distance of a measuring point to the camera center is taken into account.

The quality of the camera images recorded with cameras 12a and 12b decreases sharply towards the edge of the image, which cannot be compensated, not even with a calibration of the cameras 12a and 12b. In the overlapping areas of the cameras 12a and 12b, the distance of a measuring point Q 9 to the center of the camera image can therefore be included as weighting for the respective camera 12a and 12b. This creates a smooth transition in the overlapping recording areas of the cameras 12a and 12b. This optimization is shown in FIG. 14. As a result of this optimization, so-called hard jumps in the projection within the large-area projection 5 are avoided.

In FIG. 14 shows again a detail of the projection surface 3 with two partial areas 11a and 11b describing the detail. Here, the first triangular partial area 11a is formed by the model points $M_0$, $M_1$ and $M_2$, and the second triangular part area 11b is formed by the model points $M_0$, $M_2$ and $M_3$. Also shown are the detection area 16 of the first camera 12a and the detection area 17 of the second camera 12b, which partially overlap. The detection areas 16 and 17 each have two diagonals 18 which indicate at their respective intersections the center of the respective detection area 16 and 17.

In the example, a marker 8 projected onto the projection surface 3 was detected by the first camera 12a at the measuring point 9 $Q_{cam0(x, y, z)}$. The same marker 8 is detected by the second camera 12b at the measuring point $Q_{cam1(x, y, z)}$. Subsequently, the respective distance of the determined measuring point 9 $Q_{cam0(x, y, z)}$ and $Q_{cam1(x, y, z)}$ to the intersection at the center of the associated camera 12*a* and 12*b* is determined. As shown in FIG. 14, a first distance 19 results, which represents the distance between the intersection at the center of the detection area 16 of the first camera 12*a* and the measuring point $Q_{cam0(x, y, z)}$, and a second distance 20, which represents the distance between the intersection at the center of the detection area 17 of the second camera 12*b* and the measurement point $Q_{cam1(x, y, z)}$.

Since the determined distance 19 is significantly smaller than the determined distance 20, it is assumed that the measurement point 9 $Q_{cam0(x, y, z)}$ was determined with greater accuracy, since it was recorded closer to the center of the associated camera 12*a*. The measuring point 9 $Q_{cam1(x, y, z)}$ thus receives a greater weighting.

A weighted measuring point 9 $Q_{weighted(x, y, z)}$ may be formed, for example, by suitable weighting of the determined distances 19 and 20. In the example in FIG. 14, a greater weighting of 80% was assumed for the first distance 19 and a weighting of 20% for the second distance 20, wherefrom the depicted measuring point 9 $Q_{weighted(x, y, z)}$ was calculated.

The two processes described below for generating a large-area projection 5 can also be advantageously implemented with the described method for automatically restoring a calibrated state of a projection system.

Areas Outside the Measured Projection:

Areas that cannot be viewed by a camera can be extrapolated during recalibration or realignment, because it can be assumed, for example, that the projection was only slightly transformed in the obscured area. In this case, modified data from the original calibration can be used.

Optionally, it can be assumed that the obscured area between the last visible, determined measurement points 9 Q extends in the form of a flat surface. For most projections, this assumption is sufficiently precise for an area having a limited extent.

In a further option, the shape of the projection surface 3 or a model derived therefrom can be imaged with sufficient accuracy by a partial area of a cylinder or a sphere. In this case, the non-visible area can be simulated using the corresponding model, with these data then being used for further calculations, such as an extrapolation.

Blending:

The brightness curve (weighting function) within the blend zone 7 for the individual projectors 2*a*, 2*b*, 2*c*, 2*d* also results from a so-called intersection of the projected area. This intersection maps the number of partial images 4 projected on top of one another in the blend zone 7. For example, it can be assumed that in a blend zone 7, in which the partial images 4*a* and 4*b* overlap, the required basic brightness in this blend zone 7 can be halved for each projector 2*a* and 2*b*. For an example with a blend zone 7, where the partial images 4*a*, 4*b*, 4*c* and 4*d* overlap, it can be assumed in approximation that the required basic brightness in this blend zone 7 can be reduced to a quarter for each projector 2*a*, 2*b*, 2*c* and 2*d*.

The brightness curve is also dependent on the partial area used to display an image on the entire projection surface 3. This applies, for example, to representations having a limited size, which do not require the entire projection area 3.

In a special case, where for example a projector 2*a* is unable to project its partial image 4*a* onto a part of the projection surface 3 due to a fixed obstacle in its projection area, the content in this area may be taken over by the partial image 4*b* of the projector 2*b*. In this case, the brightness curve must be adjusted accordingly for the projector 2*b* in this area, i.e. increased, since it must illuminate this area alone in this area. Such an adjustment is, of course, possible only inside the blend zone 7, since the partial images 4*a* and 4*b* of the projectors 2*a* and 2*b* must overlap.

LIST OF REFERENCE SYMBOLS 1 projection system
2, 2*a*, 2*b*, 2*c*, 2*d* projector
3 projection surface (curved)
4, 4*a*, 4*b*, 4*c*, 4*d* partial image
5 large-area projection
6 flat projection surface
7 blend zone
8, 8' markers
9, 9', 9*a*, 9*b*, 9*c*, 9*d* measuring point (X, Y, Z coordinate) (Q0; Q1; Q2; Qn)
10 blending aperture
11, 11*a*, 11 *b* partial area (triangle)
12, 12*a*, 12*b* camera
13, 13*a*, 13*b* line of sight
14, 14*a*, 14*b* angle α
15, 15*a*, 15*b*, 15*c*, 15*d* model points ($M_0$; $M_1$, $M_2$; $M_n$)
16 detection area of the first camera
17 detection area of second camera
18 diagonal
19 first distance to the center
20 second distance to the center

The invention claimed is:

1. A method for automatically restoring a calibrated state of a projection system (1),
wherein during calibration of the projection system (1), m times n markers (8) are projected onto the projection surface (3), from which markers (8) m times n first measuring points (9), each having a respective X, Y and Z coordinate located on the projection surface (3) and hence on the surface of the 3D model, are determined with one or more cameras (12), and
wherein an association of projector coordinates to 3D coordinates (xpypi, XYZi) as well as a transformation of projector coordinates into mapping coordinates $_pK_m$ and a transformation of mapping coordinates into projector coordinates $_mK_p$ is provided, and, wherein,
for automatically restoring a calibrated state of a projection system (1), a position and orientation of the one or several cameras (12) within the projection system (1), is calculated or checked by using fixed points,
and wherein subsequently m times n markers (8') are projected onto the projection surface (3), from which a reduced number of detected second measuring points (9'), which is reduced compared to the calibration, each having a respective X, Y and Z coordinate, is determined with one or more cameras (12), that deviations between the recorded second measurement points (9') and the associated first measurement points (9) are calculated using the reduced number of recorded second measurement points (9') and a displacement vector (Offset (XYZi) is formed, that the association of the projector coordinates to 3D coordinates is adjusted with the displacement vector according to (xpypi, XYZi+ offset (XYZi), and that the position of the measurement points (9') that were not recorded is determined in this way.

2. The method according to claim 1, wherein for determining the reduced number of second measuring points (9'), an average value is formed and a measuring point (9') $Q_{average}$ is determined, wherein this average value is determined from a measuring point (9) $Q_{cam1}$ recorded with a first camera (12*a*) and a measuring point (9) $Q_{cam2}$ recorded with a second camera (12*b*) of the same marker (8) projected on the projection surface.

3. The method according to claim 1, wherein for determining the reduced number of second measuring points (9'), a measuring point (9') $Q_{cam0}$ or $Q_{cam1}$ recorded with a first camera (12*a*) or with a second camera (12*b*) is selected, whereby this selection is made in such a way that the measurement point (9') which is associated with the camera (12*a* or 12*b*) having the smallest angle (14*a*, 14*b*) between the respective line of sight (13*a*, 13*b*) of the camera (12*a*, 12*b*) and the projection surface (3) is used for further processing.

4. The method according to claim 1, wherein for determining the reduced number of second measuring points (9'), weighting is performed in the direction of a measuring point (9') $Q_{cam0}$ determined with a first camera (12*a*) or in the direction of a measuring point (9') $Q_{cam1}$ determined with a second camera (12*b*), wherein the weighting is performed in dependence of a position of the measuring point (9') $Q_{cam0}$ or $Q_{cam1}$ recorded by the camera (12*a*, 12*b*) from the image center of the respective camera (12*a*, 12*b*), with the weighting being greater in the direction of the more centrally located measuring point (9').

\* \* \* \* \*